May 9, 1950　　　　　F. STONER　　　　　2,507,357
POWER-DRIVEN HAND TRUCK
Original Filed July 12, 1945　　　　　　　　5 Sheets-Sheet 1

FIG. 1

INVENTOR.
FRANK STONER
BY
ATTORNEY

May 9, 1950 F. STONER 2,507,357
POWER-DRIVEN HAND TRUCK
Original Filed July 12, 1945 5 Sheets-Sheet 4

INVENTOR.
Frank Stoner
BY Geo. B. Pitts
attorney

INVENTOR.
Frank Stoner
BY Geo. B. Pitts
attorney

Patented May 9, 1950

2,507,357

UNITED STATES PATENT OFFICE 2,507,357

POWER-DRIVEN HAND TRUCK

Frank Stoner, Peninsula, Ohio, assignor to The Baker-Raulang Company, Cleveland, Ohio, a corporation of Ohio Original application July 12, 1945, Serial No. 604,565. Divided and this application April 27, 1946, Serial No. 665,572

7 Claims. (Cl. 180—66)

This invention relates to a truck, more particularly the traction mechanism whereby the truck is power propelled. The traction mechanism, as shown, is movably mounted to provide for steering the truck. In the disclosed application of the invention the driving and steering of the truck is manually operated by an operative walking at one end of the truck, through a guiding element and devices thereon to control the application of power to the traction mechanism.

One object of the invention is to provide an improved truck of this type wherein the control for driving, retarding and/or braking the truck is materially simplified, whereby less energy and bodily movement in moving the guiding element is required and a ready and positive control of the truck movement at maximum or reduced speed or stoppage of such movement results.

Another object of the invention is to provide in a truck an improved hydraulic power means for driving its traction mechanism and operable to effect braking thereof, whereby all gearing, chain drive, belt drive, braking mechanism and operating connections therefor are eliminated, with the result that the truck construction and its power means are simplified and the latter readily controlled.

Another object of the invention is to provide an improved truck of this type having a combined driving and braking mechanism for its traction mechanism and control elements on the truck guiding element operable to effect driving or braking of the traction mechanism without swinging the element in either direction, thereby insuring quick response to the operation of the control elements in starting, retarding or stopping the movement of the traction mechanism.

Another object of the invention is to provide for a truck an improved combined traction mechanism and a hydraulically operated motor therefor.

Another object of the invention is to provide for a truck an improved combined traction mechanism and a hydraulically operated motor therefor and controls for the fluid supply to the motor, whereby it may serve as braking means for the traction mechanism.

Another object of the invention is to provide an improved hydraulically operated motor of the rotary type wherein the rotor member of the motor is directly connected to the element which is to be driven.

A further object of the invention is to provide an improved mounting for the traction wheel of a truck and having incorporated therein means, arranged to be acted upon by the supply of liquid under pressure, to drive the wheel in either direction.

Other objects of the invention will be apparent to those skilled in the art to which my invention relates from the following description taken in connection with the accompanying drawings, wherein.

In the drawings, 1 indicates as an entirety a frame preferably formed of steel plates or bars suitably welded or otherwise rigidly connected to provide a rear section 1a and a front section 1b, the latter preferably having curvilinear side walls supporting therewithin a plate 1b' formed with an enlarged opening 1c for a purpose later referred to. The rear frame section 1a consists of depending side bars 2, to which are rigidly connected spaced angles 2', a front bar 2x connecting the side bars and a rear bar 2a, the angles and rear bar serving to movably support a material handling mechanism indicated as an entirety at 3. The upper ends of the bars 2, 2x and 2a are provided with transversely arranged angles 4 on which a battery 5 is mounted, the battery serving to supply current to a motor 6, which is later referred to. The angles 4 are connected by tie members 4a, which are welded to the lower sides thereof and the side bars 2. The battery is seated between the upper end of the rear bar 2a and an up-standing transverse plate 7 fixedly mounted on the frame 1; the battery may be slid on the angles 4 transversely of the frame section 1a or to remove it therefrom, or positioned on or removed from the section 1a by a crane engaging ears 5a on the battery 5.

The truck frame 1 is mounted for translation from place to place on a combined traction and steerable mechanism (indicated as an entirety at 9), rotatably carried by the front frame section 1b, which mechanism in the present disclosure includes a wheel 9', and one or more supporting wheels 10, which form part of the material handling mechanism 3. I may provide two pairs of wheels 10 which are mounted on swingable yokes or devices (later referred to) adapted to raise and lower the outer end portion of the load handling mechanism 3. In the form of construction shown the material handling mechanism 3 is movably connected to the frame 1, and the wheel 9' and wheels 10 co-operate to support the frame 1, when the truck is at rest or is being driven, irrespective of whether the mechanism 3 is raised or lowered and loaded or unloaded.

As shown, the driving means for the wheel 9' is of the hydraulic rotary type and is incorporated therein and the power supply for the driving means and its valve mechanism are unitarily connected with the mounting for the traction and steerable mechanism to simplify the assembly and insure a direct connection between the power supply and the driving means.

The combined traction and steerable mechanism comprises the following: 11 indicates an axle fixedly supported at its opposite ends in arms 11a which are fixed to and depend from a disk 12. The marginal portion of the disk 12 engages a ring bearing 13 of the anti-friction type, provided between the disk and marginal portion of the opening 1c, whereby the mechanism is bodily rotatable about the axis of the bearing 13 for steering the truck when the latter is being power driven or manually moved. The axle 11 is formed with ducts 14, 14', extending inwardly from its opposite ends, each duct being connected with a supply duct 14a formed in and extending through the adjacent arm 11a; in this arrangement the duct 14 and the adjacent duct 14a supply fluid—such as oil—(which supply is under pressure) to the driving means or motor, indicated as an entirety at 15, to drive the wheel 9' in one direction and the duct 14' and the adjacent duct 14a supply fluid to the driving means or motor 15 to drive the wheel in the opposite direction. The hydraulic rotary motor consists of a stator 16 fixed to the axle 11 and having an outer wall eccentric to the axis of the axle 11, as shown at 16x and a rotor 17 suitably fixed to the rim 9a for the wheel 9', the rim 9a being preferably provided with a tire of the solid rubber type. The rotor 17 and wheel 9' are mounted to rotate on the axle 11 in the following manner; 18 indicates cup shaped hub members rigidly secured to the opposite ends of the rotor 17 by cap screws 18a. The hub members 18 are interiorly shaped to accommodate suitable anti-friction bearings 19, the inner end of the inner race of each bearing being seated against an annular shoulder provided on the axle 11, and its outer end being biased inwardly by a coiled spring 19a interposed between it and the outer end wall of the adjacent hub member 18. Annular disks 20, which are interposed between the rotor 17 and hub members 18 and fixed thereto by the screws 18a, extend inwardly beyond the rotor 17 to engage the inner ends of the outer races for the bearings 19 and maintain them in their seats provided on the inner walls of the hub members 18. The stator 16 is mounted between the disks 20, which prevent endwise movement thereof longitudinally of the axle.

Figure 4:
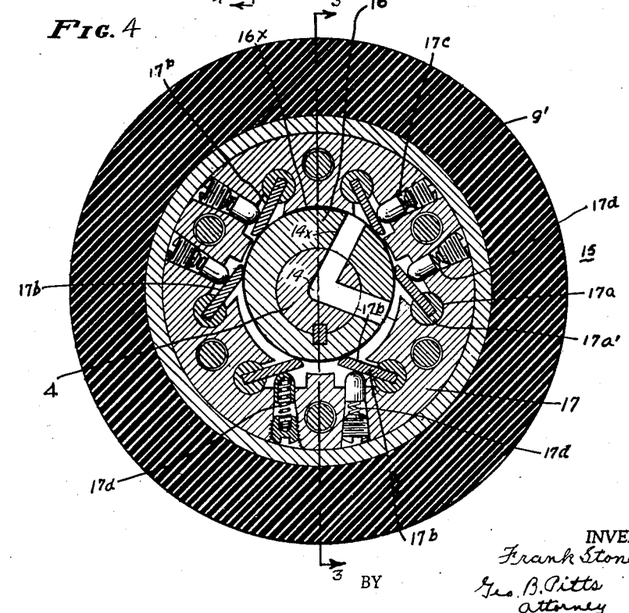
Figs. 4 and 5 are sections on the lines 4—4 and 5—5, respectively, of Fig. 3.
Figure 5:
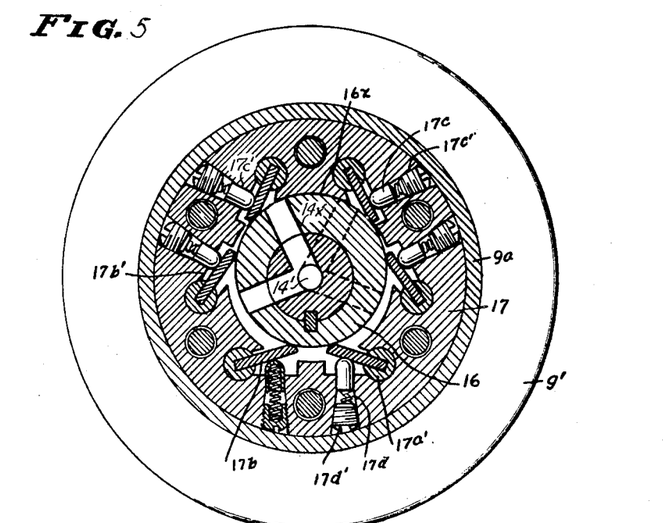

The inner wall of the rotor 17 is formed with a plurality of cylindrical sockets 17a disposed parallel to and equal distances from the axis of the axle 11 and each oscillatably supporting therein a pin 17a' to which is rigidly secured a follower 17b. Each follower extends into the chamber between the rotor 17 and stator 16 and rides the surface of the latter as the rotor 17 rotates. The inner wall of the rotor 17 is recessed opposite the outer end of each follower, as shown at 17b', to accommodate the swinging movement of the follower as it rides the eccentric portion of the stator 16. Each follower 17b is biased inwardly about the axis of the adjacent pin 17a' by a plunger 17c slidably mounted in an opening 17c' formed in the rotor 17. Each plunger 17c is preferably hollow to form a seat for the inner end of a spring 17d, its outer end abutting a plug 17d' threaded into the outer end portion of the adjacent opening 17c'. As will be observed from Figs. 4 and 5, I provide two sets of followers 17b, the followers of each set being uniformly spaced about the axle 11 and each follower of one set being disposed between two followers of the other set; also, that the followers 17b of one set extend in a clockwise direction and those of the other set extend in a counter-clockwise direction (as viewed in Figs. 4 and 5). Accordingly, fluid supplied through ducts 14 a, 14 and a port 14x formed in and leading through the axle 11 and stator 16 and having its outlet at one side of the eccentric 16x will apply high pressure to the followers 17b which extend counter-clockwise to rotate the rotor 17 (clockwise as viewed in Figs. 4 and 5), the supplied fluid being discharged on the low pressure side through a port 14x' at the opposite side of the eccentric and formed in and leading through the stator 16 and axle 11 and connected to the duct 14' (see Fig. 5); likewise, fluid supplied through ducts 14a, 14' and port 14x' will apply high pressure to the followers 17b which extend clockwise to rotate the rotor 17 (counter-clockwise as viewed in Figs. 4 and 5), the supplied fluid being discharged on the low pressure side through the port 14x and ducts 14, 14a. From the foregoing description it will be noted that by controlling the flow of the fluid, the motor 15 may be driven in either direction. It will be understood that upon the admission of the fluid through one port to the rotor 17, pressure is initially applied to one active follower 17b and then progressively to the correspondingly positioned followers as the rotor rotates and that this pressure continues until the supplied fluid is discharged through the other port, whereas the oppositely disposed followers 17b will yield in the direction of fluid flow in opposition to the springs 17d to permit the fluid pressure to be maintained on the active followers until it is discharged through the latter port. By preference I provide at opposite sides of the eccentric 16x two ports 14x, 14x', respectively, so that the pressure may be applied to two active followers substantially simultaneously.

Figure 1:
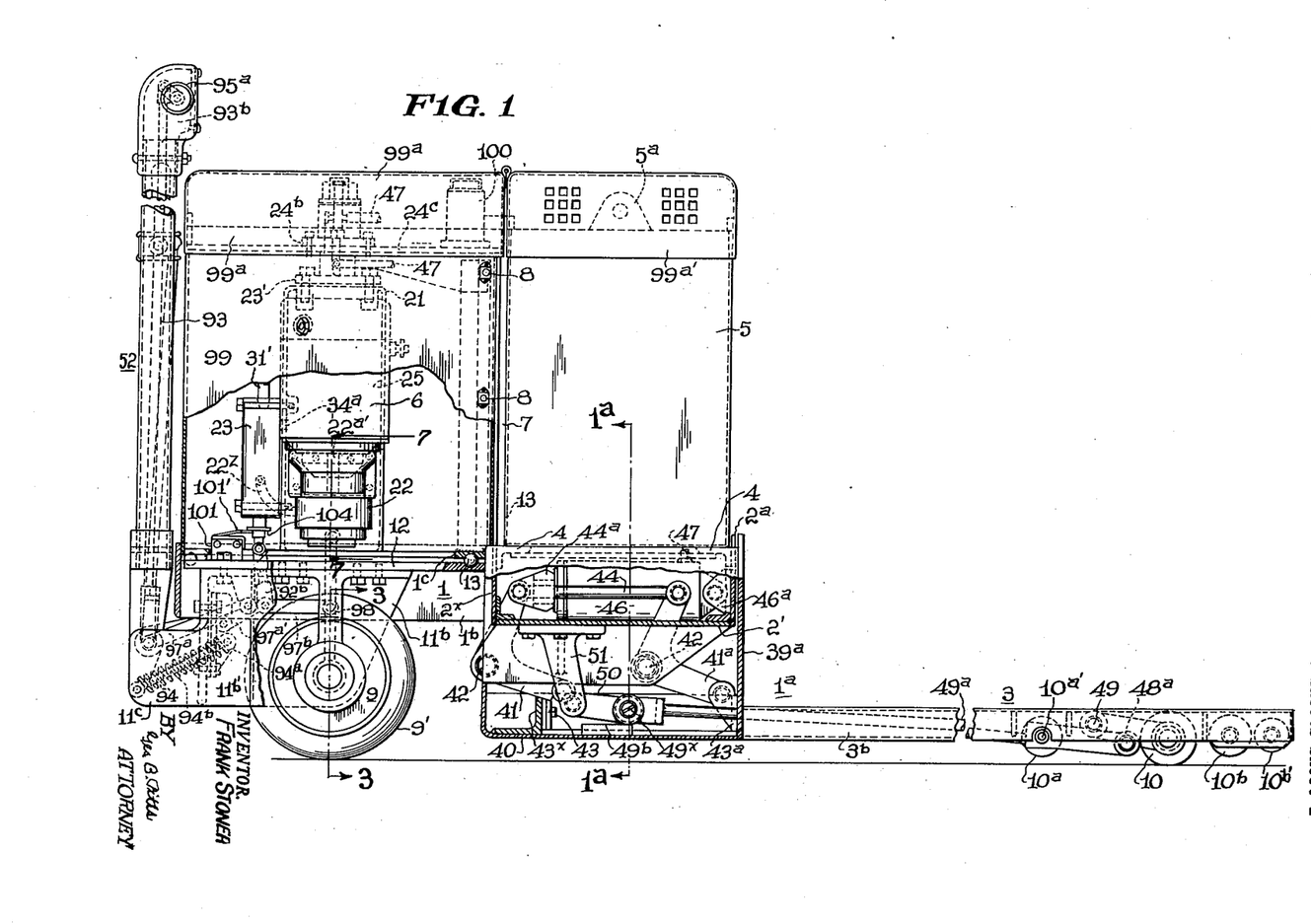
Fig. 1 is a side elevation of a truck embodying my invention, parts being broken away.
Figure 2:
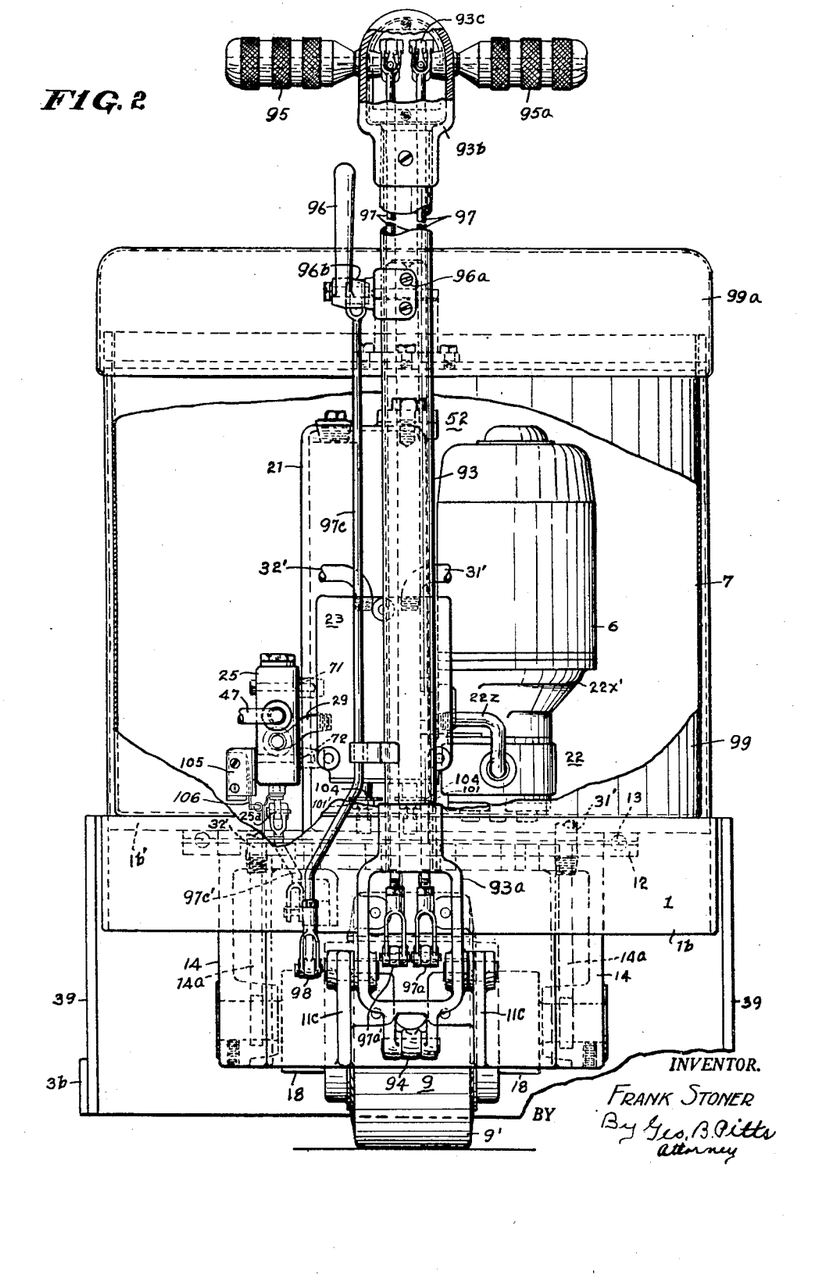
Fig. 2 is a front elevation.
Figure 3:
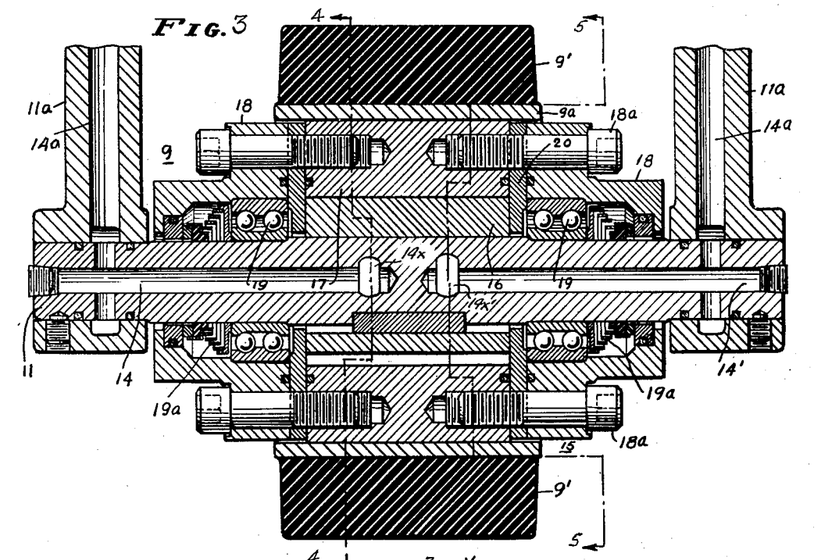
Fig. 3 is a section on the line 3—3 of Figs. 1 and 4.

The fluid supply for the motor 15 consists of a tank 21 for holding a supply of fluid, fixed to the disk 12, a rotary pump indicated as an entirety at 22, driven by the motor 6, for circulating the fluid, a valve mechanism indicated as an entirety at 23 for controlling the fluid supply to the ducts 14a and operating means (later referred to) for the valve mechanism 23. The top wall of the tank 21 has secured to it a plate 23', (see Fig. 1) which is provided with an up-standing shaft in co-axial relation with the axis of the ring bearing 13 and rotatably mounted in a suitable bearing carried by a collar which is suitably fixed to a base plate 24b rigidly secured to a bracket 24c carried by the upper end portion of the wall 7. The upper end portion of the shaft is screw threaded to take a nut 23d, which when tightened co-operates with the ring bearing 13 to rotatably support the wheel 9' and motor 15 and parts carried by the disk 12 in the frame section 1b and maintain them against vertical movement relative to the latter. The casing for the pump 22 is bolted directly to the side wall of the tank and preferably consists of an upper section 22a, a lower section 22b, an annular side section 22c and bearing supporting members 22d spaced by the side section 22c and interposed therebetween the latter and the upper and lower casing sections. The casing sections are assembled in alined relation by dowel pins 22g and secured together by bolts. The members 22d support bearings (preferably of the anti-friction type) for the shafts 22e for suitable impellers 22f, one of said shafts being extended upwardly and directly coupled to the shaft of the motor 6. The upper casing section 22a is formed with a recess 22a' in registry with an opening in the side wall of the tank 21 and connected to a duct 22x leading into one side of the pump chamber, whereas the side section 22c is formed with an outlet 22c', remote from the outlet end of the duct 22x, connected to a pipe 22z, which leads to the valve mechanism 23, as shown in Figs. 1 and 2. The upper pump section preferably terminates in an inverted bell-shaped wall 22x' which is secured to the lower end of the motor 6.

The valve mechanism 23 is provided with two separately operating valves, whereby the fluid may be supplied to the motor 15 to drive the wheel 9' in either direction, and is constructed to operate as follows: When the valve elements are in neutral or normal position, the fluid is by-passed through the valve casing and is returned to the tank 21, this return preferably being through a valve mechanism 25 for controlling the material handling mechanism 3 to operate the latter when the truck is at rest, whereby separate fluid connections between the pump 22, the valve mechanism 25 and tank 21 are eliminated, since no occasion would arise for driving the traction wheel 9' and simultaneously operating the mechanism 3 to raise it. The casing for the valve mechanism 23 is mounted on the front wall of the tank 21 and preferably formed in sections and provided therein with flow channels as follows: 26 indicates a transverse channel having at its upper end an extended channel 26a parallel to the upper portion of the channel 26. 27 indicates a supplemental transverse channel. 28 indicates an outlet channel leading to an outlet 28a, which is connected to a pipe 29. The pipe 29 is connected to the valve mechanism 25, from which the fluid is returned to the tank 21 or utilized to operate the load handling mechanism 3, as hereinafter set forth. 30 indicates the inlet to which the supply pipe 22z for the fluid is connected, for supplying fluid to the channels 26, 26a. 31, 32, indicate flow channels connected through outlets to pipes 31', 32', respectively, the pipe 31' being connected to the duct 14a which is connected with the duct 14', to drive the wheel 9' in the direction to effect forward travel of the truck when the valve element (indicated as an entirety at 33) is operated and the pipe 32' being connected to the duct 14a which is connected to the duct 14 to drive the wheel 9' in the opposite or rearward direction when the valve element (indicated as an entirety at 33') is operated. As will be observed, when the fluid is supplied through the pipe 31' to the motor 15 for forward truck travel, the fluid in the ducts 14', 14a, is forced by the motor back through pipe 32' for return flow to the tank 21 and when the fluid is supplied through pipe 32' to the motor 15 for rearward truck travel, the fluid in the ducts 14, 14a, is forced by the motor back through pipe 31' for return flow to the tank 21, the valve mechanism 23 being constructed, as will later be set forth, to provide for this return fluid flow to thus eliminate separate flow connections from the motor 15 to the tank 21. The channel 31 is provided with branch channels 31a, 31b, 31c, whereas the channel 32 is provided with branch channels 32a, 32b, 32c. 34 indicates a return flow channel for the fluid having an outlet 34a which registers with an opening formed in the adjacent wall of the tank 21. 35 indicates a longitudinally extending opening in line with and connected with the channels 27, 26a, 26, 31c, 31b, 34 and 31a, the wall of the opening 35, between certain of said branch channels, forming a guide for the valve element 33 and flow ports for the fluid between said channels dependent upon the position of the valve element 33. 36 indicates a longitudinally extending opening in line with and connected with the channels 28, 27, 26, 32c, 32b, 34, 32a, the wall of the opening 36, between certain of said branch channels, forming a guide for the valve element 33' and flow ports between said channels dependent upon the position of the valve element 33'. The outer end of the valve element 33 when in neutral position (see Fig. 6) terminates in the channel 31b, so as to permit fluid flow from the pipe 31' through the channels 31a, 31, 31b, and opening 35 to the channel 34, but when the valve element 33 is operated (as later set forth toward the left as viewed in Fig. 6), the opening 35 between the channels 31b, 34, is closed. As shown, portions of the valve element 33 are reduced to form annular recesses 33a, 33a' the opposite outer end walls of which provide cut-offs 33b, 33b'. Also, as shown, portions of the valve element 33' are reduced to form annular recesses 33c, 33c', the opposite outer end walls of which provide cut-offs 33d, 33d', and the outer end of the valve element, when in neutral position, terminates in the channel 32b so as to permit fluid flow from the pipe 32' through the channels 32a, 32, 32b and opening 36 to the channel 34, but when the valve element 33' is operated (as later set forth toward the left as viewed in Fig. 6) the opening 36 between the channels 32b, 34, is closed.

Figure 6:
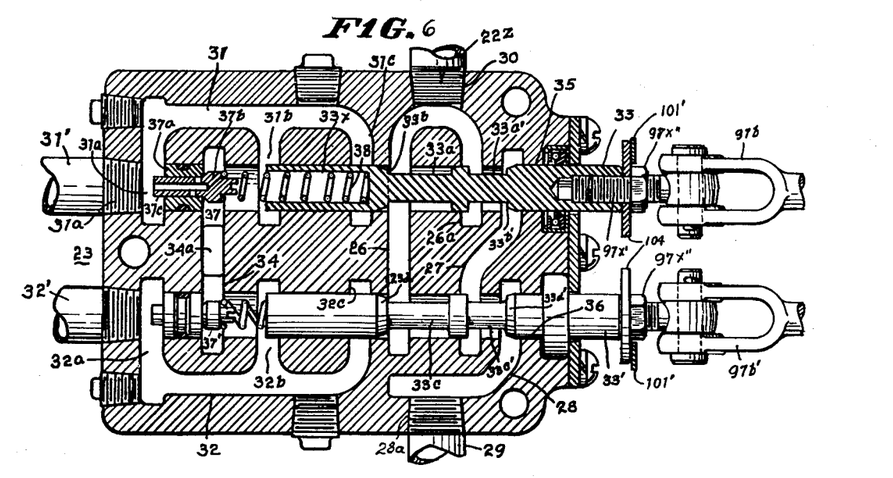
Fig. 6 is a sectional view of the valve mechanism.
Figure 7:
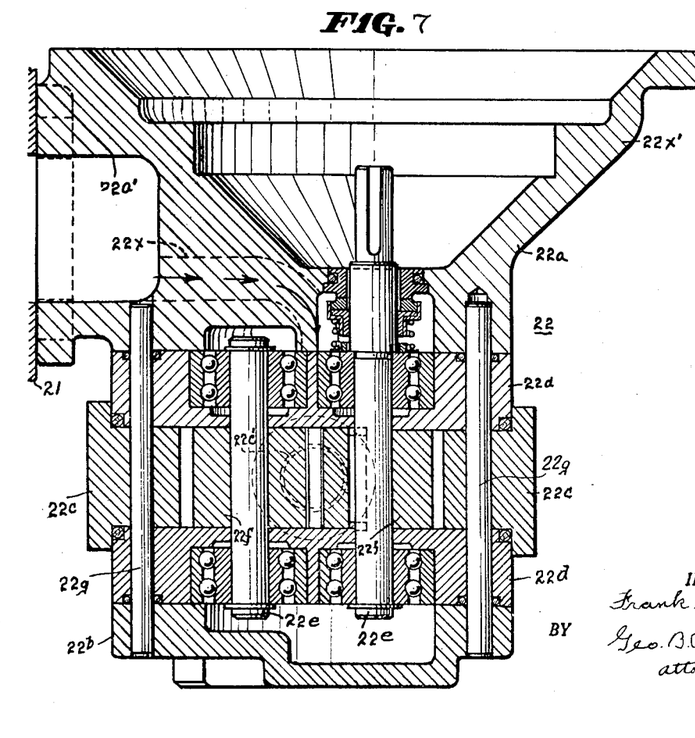
Fig. 7 is a fragmentary section on the line 7—7 of Fig. 1.

When both valve elements 33, 33', are in neutral position (as shown in Fig. 6) and motor 6 is operating to drive the pump 22 the fluid from the supply pipe 22z flows through channel 26a, recess 33a', channel 27, recess 33c', channel 28 and pipe 29 and returns to the tank 21, as already set forth. If valve element 33 is operated, cut-off 33b' closes the channel 26a, cut-off 33b opens the connection between the channels 26, 31c, and the outer end of the valve element closes the connections between the channel 31b and channel 34, so that the fluid from supply pipe 22z flows through channel 26, recess 33a, channel 31c, channel 31 and channel 31a, to the pipe 31' to one side of the motor 15 and from the other side of the motor through pipe 32', channel 32a, channel 32, channel 32b, opening 36, channel 34 and opening 34a to the tank 21; and if the valve element 33' is operated, the cut-off 33d' closes the channel 27, cut-off 33d opens the connections between the channel 26 and channel 32c and the outer end of the valve element closes the connections between the channel 32b and channel 34, so that the fluid from the supply pipe 22z flows through the channel 26, recess 33c, channel 32c, channel 32, channel 32a and pipe 32' to the opposite side of the motor 15 and from the first mentioned side thereof through pipe 31', channel 31a, channel 31, channel 31b, opening 35, channel 34 and opening 34a to the tank 21. If both valve elements 33, 33', are simultaneously operated the fluid will be supplied to both sides of the motor 15 through the respective channels as above set forth, the effect of which is to stop it and hence stop the wheel 9'; accordingly, when the truck is in motion, due to operation of one of the valve elements, the other valve element may be operated and thus provide fluid pressure from the supply pipe 22z in opposition to the return flow of fluid from the motor 15, the effect of which is to retard the operation of the motor and to slow down the rotation of the wheel 9' and bring the motor to a stop, if desired. It will thus be observed that when the truck is being driven in either direction, the valve elements 33, 33', may be operated to increase or decrease the speed of the truck as well as provide a braking effect whether the truck is traversing a level or inclined surface. In this arrangement mechanical braking elements for the wheel or motor and a separate control therefor are eliminated. Due to the fact that the fluid system and motor rotor 17 are completely filled with fluid at all times, operation of either valve element 33, 33', insures quick starting, and operation of both elements insures ready braking and stoppage of the motor 15.

37, 37', indicates as entireties relief valve means mounted in the outer ends of the openings 35, 36, respectively, to relieve excessive pressure which may exist in the fluid system at any time. As these valve means are similar in construction, one (valve means 37) only will be referred to. The valve means 37 consists of a sealing member 37a seated in the opening 35 and formed with a through opening, the inner end of which serves as a seat for a valve element 37b. The valve element 37b is provided with a hollow shank 37c which slidably fits the opening through the element 37a. The outer end of the shank 37c is open to admit fluid thereinto from the channel 31a and its side wall is formed with a port (preferably two ports, in disalinement longitudinally) to connect the opening in the shank with the channel 34 when the valve element 37b is unseated. The valve element 37b is normally held in engagement with its seat by an expansion spring 38 interposed between it and the valve element 33, the outer end portion of which is formed with an inwardly extending recess 33x to accommodate the spring and permit a long spring to be employed. In this arrangement, each spring 38 is put under compression when the adjacent valve element 33 or 33' is operated to prevent operation of the relief valve when the fluid is being supplied to the motor 15 through the pipe 31' or pipe 32'.

The load handling mechanism 3 may consist of a single load carrying member for loads, but by preference such support consists of spaced, fixedly related parallel load carrying members adapted to be raised and lowered hydraulically by a reciprocatable piston mounted in a cylinder 46 and operatively connected to levers 41, which in turn are connected to the yokes 48a to swing the wheels 10 about the shafts 49 for the yokes.

Due to the fact that the truck is guided or steered by the operative through the instrumentality of a manually operated element, indicated as an entirety at 52, the controls (later referred to) for the motor 15 and material handling mechanism 3 and the fluid supply tank 21, motor 6 and fluid circulating pump 22 are mounted on the rotatable disk 12, and the fluid connection 47 between the valve 25 and the cylinder 46 is preferably provided in the joint or bearing elements (already referred to), whereby fluid flow between the valve 25 and cylinder 46 is provided for while permitting steering of the wheel 9'.

The arms 11a depend from a bracket fixed to the disk 12 and are provided with integral skirts 11b, which in turn are related to side skirts 11b', that terminate in a pair of spaced, parallelly related outwardly extending supports 11c. The guide or steering element 52 consists of a tubular member 93, a loop shaped member 93a at its lower end and a housing member 93b at its upper end. The side walls of the loop shaped member 93a are fulcrumed on and between the supports 11c (see Fig. 2), whereby the steering element 52 may be bodily swung forwardly into convenient position to be grasped by the operative for guiding and controlling the movement of the truck. The lower end of the member 93a is pivotally connected to the outer end of a rod 94; the inner end portion of the rod is slidable in a fitting 94a suitably mounted on a rock shaft which is supported in the skirts 11b'. A spring 94b coiled around the rod 94 and interposed between the fitting 94a and the knuckle at the outer end of the rod 94 normally tends to swing the element 52 upwardly and maintain it in vertical position as shown in Fig. 1. The construction of the steering element 52 provides for the mounting of the controlling devices 95, 95a, for the valve mechanism 23 and a controlling device 96 for the valve mechanism 25 at or adjacent its outer end, whereby the operation of the rotary motor 15 and material handling mechanism 3 may be effected by the operative independently of the position of the steering element, so that bodily movement thereof is not required to operate or stop the motor 15 and the mechanism 3. The controlling devices 95, 95a, consist of handles rotatably mounted in the side walls of the housing member 93b (preferably in axial relation) and extending laterally therefrom. The inner end of each handle is provided with an arm 93c, the outer end of which is pivotally connected to the upper end of a rod 97. The lower end of the rod 97, which is connected to the handle 95a, is pivotally connected to the outer end of a bell-crank 97a, which is mounted on the adjacent skirt 11b', and the bell-crank 97a is pivotally connected to the outer end of a link 97b which in turn is connected to the valve element 33. Accordingly, by rotation of the handle 95a counter-clockwise, the valve element 33 is operated toward the left (as viewed in Fig. 6) to supply fluid to the motor 15, as already set forth. The lower end of the rod 97, which is connected to the handle 95, is pivotally connected to the outer end of a bell-crank 97a', mounted on the adjacent skirt 11b', the inner end of the bell-crank being pivotally connected to a link 97b', which in turn is connected to the valve element 33'; accordingly, by rotation of the handle 95 counter-clockwise the valve element 33' is operated toward the left (as viewed in Fig. 6) to supply fluid to the motor 15, as already set forth.

As shown in Fig. 6, each link 97b, 97b', is pivotally connected to a thrust element 97x' threaded in the outer end portion of the adjacent valve element and locked by a nut 97x'', whereby the operating connections between each handle 95, 95a, and the adjacent valve element may be adjusted to insure accurate operation of the latter.

The controlling element 96 consists of a handle pivotally mounted on a bracket 96a carried by the steering element 52 and provided with an arm 96b pivotally connected to the upper end of a rod 97c. The lower end of the rod 97c is pivotally connected to the outer end of a bell-crank 98 (the axis of the pivot for the lower end of the rod 97c being in line with the axis on which the element 52 swings) fulcrumed on a stud shaft carried by the adjacent skirt 11b'. The inner end 98a of the bell-crank 98 is pivotally connected to the outer end of a link 97c' which is pivotally connected to the valve element or plunger 25d for the valve mechanism 25 for controlling the latter.

99 indicates a casing or housing extending around the parts mounted on the disk 12 and fixed to the side bars forming the frame section 1b and 99a, 99a', indicate hoods fitting over the casing 99 and battery 5, the hoods being hinged together.

Figures 8, 9:
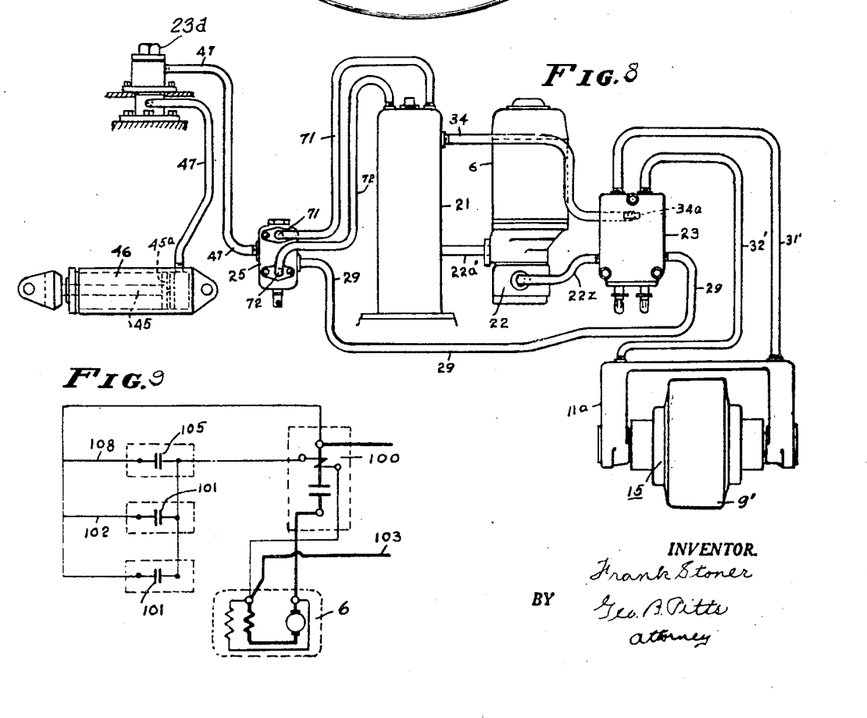
Figs. 8 and 9 are diagrammatic views.

From the foregoing description it will be observed that the pressure fluid system provides for the circulation of the fluid by continuous operation of the electric motor 6 to drive the pump 22 and return thereof to the tank 21 during the periods when the truck is not being driven or the load handling mechanism 3 is in either lowered or elevated position. This operation may be carried out by providing a suitable switch to close the motor circuit through a contactor 100. I prefer however to maintain the electric motor 6 at rest during these periods and to automatically close the circuit to the motor 6 and drive it each time either valve mechanism 23 or 25 is operated. In this preferred arrangement I provide a switch 101 adjacent to each valve plunger 33, 33' (see Fig. 1—these switches for valve plungers 33, 33', shown diagrammatically in Fig. 9), so that when either thereof is operated to supply fluid pressure to the motor 15, the adjacent circuit 102 will operate the contactor 100 to close the motor circuit 103 for the motor 6. Each switch consists of suitable contacts in a housing and a resilient switch arm 101' normally disengaged from the contacts, the outer end portion of the arm being disposed in the path of movement of a collar 104 fixed to the adjacent valve plunger 33 by the nut 97x", so that operation of the plunger will swing the arm 101' inwardly and close the circuit 102. The corresponding switch, indicated at 105 (see Fig. 9), for the valve plunger 25d of valve mechanism 25, is provided with a resilient contact closing arm 106, arranged to be operated by a cam fixed to the valve plunger 25d when the latter is moved downwardly, such operation serving to close the circuit 108 and operate the contactor 109. In the arrangements above described, economical use of the current supplied by the battery 5 results, since the electric motor 6 is driven only when fluid pressure is required and since the fluid system remains at all times filled with fluid, no delay occurs in operating the motor 15 or load handling mechanism 3 upon operation of the valve mechanisms which control the fluid supply therefor. This application is a division of my application Ser. No. 604,565, filed July 12, 1945.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In a truck having a frame, a combined traction and steerable mechanism rotatably mounted in one end portion of said frame, said traction and steerable mechanism including an axle, a traction wheel rotatably mounted on said axle intermediate its opposite ends and a hydraulic reversible rotary motor between said axle and wheel, said axle being formed with liquid circulating ducts leading inwardly from its opposite end portions, and means for supplying liquid to and from said ducts for driving said motor in either direction, a valve mechanism for controlling the flow of the liquid in either direction, and an element connected to said first mentioned mechanism for steering the truck during operation thereof.

2. A truck as claimed in claim 1 wherein the valve mechanism is provided with separate control valve elements operable to control the supply of liquid to either side of said motor or both sides thereof simultaneously.

3. In a truck, the combination with a frame, of a combined traction and steerable mechanism rotatably mounted in one end portion of said frame, said traction and steerable mechanism including an axle, a traction wheel rotatably mounted on said axle intermediate its opposite ends and a hydraulic reversible rotary motor between said axle and wheel, said axle being formed with liquid circulating ducts leading inwardly from its opposite end portions, and means for supplying liquid under pressure to and from said motor for driving it in either direction, a valve mechanism for controlling the flow of the liquid in either direction, and an element connected to said first mentioned mechanism for steering the truck during operation thereof.

4. A truck comprising a frame, wheels for supporting said frame, a hydraulically operated motor for driving one of said wheels, said motor consisting of a stator fixed to the axle for said driven wheel and having an eccentric outer surface, a rotor fixed to said wheel, sets of followers swingably mounted at their outer ends on said rotor on an imaginary circle concentric to said axle and extending into the space between said stator and rotor for engagement with the outer surface of said stator, and means for yieldingly maintaining the inner ends of said followers in engagement with said stator, each follower of each set being positioned between two followers of the other set and all of the followers of one set extending in a clockwise direction and all of the followers of the other set extending in a counter-clockwise direction, a source of liquid supply under pressure, separate liquid supply ducts leading through the axle for said driven wheel and having a connection to the space between said rotor and said stator at opposite sides, respectively, of the throw of said stator, a valve mechanism for selectively controlling the flow of liquid to each of said connections, and means for operating said valve mechanism to supply liquid to each of said connections.

5. A truck as claimed in claim 4 wherein said valve mechanism is provided with separate valve elements operable independently or simultaneously, whereby liquid may be supplied to either of said connections or to both connections simultaneously.

6. A traction wheel for a truck comprising an axle connected at its opposite ends to the truck frame, a tired rim surrounding said axle, a hydraulically operated motor between said axle and rim and consisting of a stator fixed to said axle and having an eccentric outer surface, a rotor within and fixed to said rim, hub members at opposite sides of said motor fixed to said rotor, anti-friction bearings between said hub members and said axle, followers carried by said rotor and extending into the space between said rotor and said stator and arranged to engage the latter, said axle being formed with a duct connected at its inner end to a port leading through said stator into the space between it and said rotor, and valve controlled means for supplying liquid under pressure to the outer end of said duct.

7. In a truck having a frame and wheels for supporting one end of said frame, a combined traction and steerable mechanism for supporting the opposite end of said frame, said mechanism comprising a disk rotatably mounted in said frame, a traction wheel having an axle below and connected to said disk, a hydraulically operated rotary motor disposed between said axle and said wheel, means carried by said disk for supplying liquid under pressure and liquid connections between said liquid supply means and each side of said motor, a portion of each connection leading through said wheel axle, a valve mechanism on said disk for controlling the flow of the liquid to said motor, and a manually operated device for rotating said disk to steer the truck.

FRANK STONER.

REFERENCES CITED

The following references are of record in the file of this patent:

UNITED STATES PATENTS

| Number | Name | Date |
|---|---|---|
| 883,188 | Gause et al. | Mar. 31, 1908 |
| 1,380,596 | Rudqvist | June 7, 1921 |
| 1,803,932 | Dooley | May 5, 1931 |
| 2,320,600 | Howell | June 1, 1943 |
| 2,325,396 | Hastings, Jr. | July 27, 1943 |
| 2,359,493 | Schreck | Oct. 3, 1944 |
| 2,417,018 | Schroeder | Mar. 4, 1947 |